Dec. 1, 1953  C. B. SPASE  2,661,086
FRICTION CLUTCH WITH LEVER FULCRUM RING ASSEMBLY
Filed June 16, 1950  2 Sheets-Sheet 1

INVENTOR:
Charles B. Spase,
BY
Bodell & Thompson
ATTORNEYS.

Dec. 1, 1953 C. B. SPASE 2,661,086
FRICTION CLUTCH WITH LEVER FULCRUM RING ASSEMBLY
Filed June 16, 1950 2 Sheets-Sheet 2
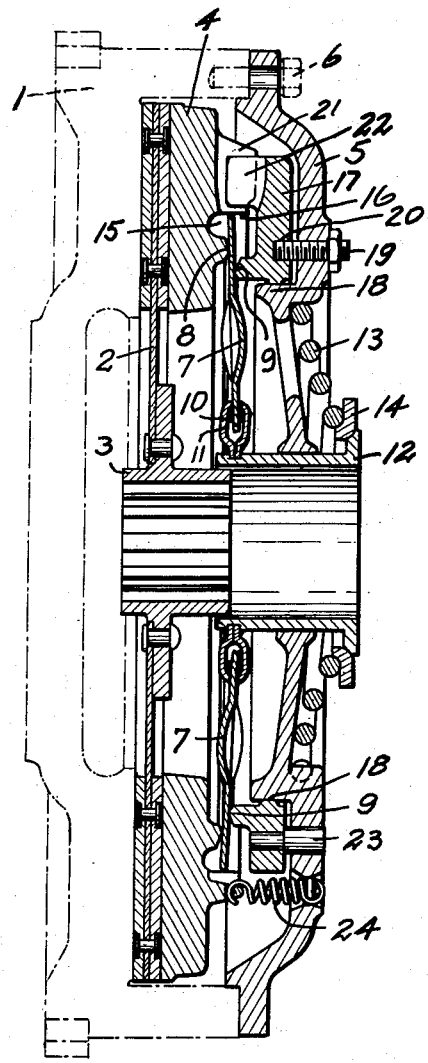
INVENTOR:
Charles B. Spase,
BY
Bodell & Thompson
ATTORNEYS.

Patented Dec. 1, 1953

2,661,086

UNITED STATES PATENT OFFICE 2,661,086

FRICTION CLUTCH WITH LEVER FULCRUM RING ASSEMBLY

Charles B. Spase, Nedrow, N. Y., assignor to Lipe-Rollway Corporation, Syracuse, N. Y., a corporation of New York Application June 16, 1950, Serial No. 168,463

2 Claims. (Cl. 192—111)

This invention relates to friction clutches particularly adapted for use in motor vehicles, which clutches are of the type including driving and driven members, a pressure ring or plate pressing against one side of the driven member to compress the driven member between it and the driving member, throw-out mechanism which includes a throw-out collar and radial motion transmitting and multiplying levers between the throw-out collar and the pressure ring and slidably pressing on the pressure ring and also slidably engaging a fulcrum carried by the back plate of the clutch construction, and clutch spring means loaded to normally act through the levers on the throw-out collar to hold the clutch engaged.

The clutch is of the general type shown in my application, Ser. No. 148,201, filed March 7, 1950, now abandoned.

The object of the invention is a fulcrum ring carrying a fulcrum on which the clutch levers are slidably fulcrumed, which fulcrum ring is secured to the back plate of the clutch by adjusting screws by means of which the fulcrum ring is adjustable axially to take up for wear of the clutch faces and is interlocked by driving lugs with the pressure ring.

The invention consists in the novel features and in the combinations and constructions hereinafter set forth and claimed.

In describing this invention, reference is had to the accompanying drawings in which like characters designate corresponding parts in all the views.

Figure 2 is a sectional view taken on line 2—2, Figure 1.

Figure 1:
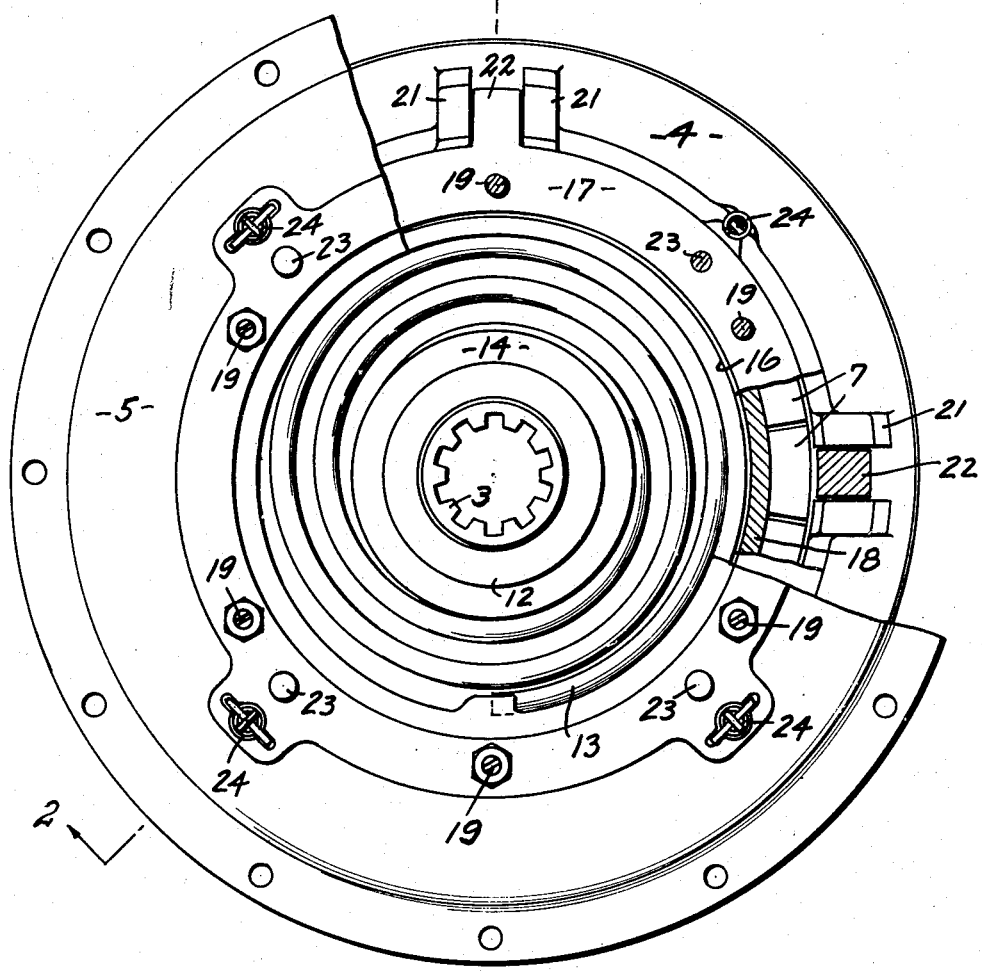
Figure 1 is a rear elevation of the clutch, partly broken away.

In the drawings, the numeral 1 designates the driving member of the clutch which is usually the fly wheel of the engine of the vehicle, this being mounted on the crank shaft of the engine.

2 designates the driven member which is the usual plate having a hub 3 splined on the driven or clutch shaft.

4 designates the pressure ring, and 5 the back plate bolted at 6 to the rim of the fly wheel. The fly wheel is formed with the usual recess in which the driven member and the pressure ring are located.

7 designates a series of radially extending clutch levers slidably pressing on an annular rib 8 on the pressure ring and slidably fulcrumed on a fulcrum 9 on a part supported from the back plate 5. These levers being coupled at 10 to an annular coupling device 11 on the front end of a throw-out sleeve or collar 12 which shifts axially of the clutch shaft.

13 is the clutch spring, here shown as interposed between the back plate and an annular flange 14 on the rear end of the throw-out collar 12. The throw-out collar is operated by a lever, as the clutch pedal in the usual way. The outer ends of the levers 7 extend into an annular recess 15 on the rear side of the pressure ring 4. The recess provides an internal cylindrical shield or surface 16 opposed to the end edges of the lever 7 with a normal clearance.

The feature of the invention is the fulcrum ring 17 on which the fulcrum 9 is formed, this being mounted to slide axially on a cylindrical flange 18 on the inner side of the back plate 5 and adjustable axially by means of adjusting screws 19 threading through the back plate and thrusting against the fulcrum ring 17, and interlocking lugs 21, 22, on the pressure ring and the fulcrum ring. The adjusting screws extend into unthreaded recesses or wells 20 in the fulcrum ring and thrust against the bottoms of the wells and hence would act as driving lugs to transmit turning force to the fulcrum ring, or from the fulcrum ring to the back plate.

Owing to the absence of the usual driving lugs on the back plate and pressure ring, the back plate can be pressed out or made more economically than when provided with driving lugs. Owing to the driving lugs 21, 22, between the pressure ring and fulcrum ring, the initial relative position of the driving lugs 21, 22, is not modified during axial adjustment of the fulcrum ring and the pressure ring, as the two rings shift axially as a unit when the fulcrum ring is adjusted axially to compensate for wear of the clutch friction facings.

Driving pins or lugs 23 inserted in alined holes in the back plate 5 and the fulcrum ring 17 may be used to relieve the adjusting screws of transmitting the torque. Also the usual springs 24 between the pressure ring 4 and the back plate may be used to retract the pressure ring when the clutch pedal is operated to release the clutch.

What I claim is:

1. A friction clutch of the class described comprising driving and driven members, a pressure ring, the driven member extending between the pressure ring and the driving member, a back plate rotatable with the driving member, throw-out mechanism comprising a throw-out collar and radial levers operated thereby slidably pressing on the pressure ring and slidably fulcrumed on a fulcrum ring carried by the back plate, and clutch spring means acting on the throw-out collar and located to engage the clutch; the clutch construction being characterized by the back plate having on its inner side adjacent to the pressure ring a cylindrical surface and said fulcrum ring being slidably mounted on said surface for axial adjustment toward and from the pressure ring, adjusting screws extending through the back plate and rotatable in recesses in the fulcrum ring and thrusting against the fulcrum ring, and driving lugs between the pressure ring and the periphery of the fulcrum ring.

2. A friction clutch of the class described comprising driving and driven members, a pressure ring, the driven member extending between the pressure ring and the driving member, a back plate rotatable with the driving member, throw-out mechanism comprising a throw-out collar and radial levers operated thereby slidably pressing on the pressure ring and slidably fulcrumed on a fulcrum ring carried by the back plate, and clutch spring means acting on the throw-out collar and located to engage the clutch; the clutch construction being characterized by the back plate having on its inner side adjacent to the pressure ring a cylindrical surface and said fulcrum ring being slidably mounted on said surface, driving lugs slidably coacting in an axial direction with said fulcrum ring and back plate, and adjusting screws extending through the back plate and thrusting against the fulcrum ring.

CHARLES B. SPASE.

References Cited in the file of this patent
UNITED STATES PATENTS

| Number | Name | Date |
|---|---|---|
| 1,131,769 | Borg | Mar. 16, 1915 |
| 1,489,423 | Brown et al. | Apr. 8, 1924 |
| 1,886,294 | Morris | Nov. 1, 1932 |
| 1,923,438 | Hughes | Aug. 22, 1933 |
| 1,942,691 | Fink | Jan. 9, 1934 |
| 2,064,450 | Spase | Dec. 15, 1936 |
| 2,117,482 | Klix | May 17, 1938 |
| 2,171,829 | Haupt | Sept. 5, 1939 |